(12) United States Patent
Cesar Bitar et al.

(10) Patent No.: US 10,158,493 B2
(45) Date of Patent: Dec. 18, 2018

(54) SOLUTION FOR GENERATING AND ISSUING SECURITY CODES WITH GUARANTEED ISSUER AUTHENTICITY AND ORIGIN

(71) Applicant: RD2Buzz Brasil Consultoria E Internet Ltda., São Paulo (BR)

(72) Inventors: Paulo Cesar Bitar, São Paulo (BR); Eduardo Deperon Piovesam, São Paulo (BR)

(73) Assignee: RD2BUZZ Brasil Consultoria E Internet LTDA., São Paulo (BR)

( * ) Notice: Subject to any disclaimer, the term of this patent is extended or adjusted under 35 U.S.C. 154(b) by 131 days.

(21) Appl. No.: 15/113,223

(22) PCT Filed: Jan. 19, 2015

(86) PCT No.: PCT/BR2015/050003
§ 371 (c)(1),
(2) Date: Jul. 21, 2016

(87) PCT Pub. No.: WO2015/117212
PCT Pub. Date: Aug. 13, 2015

(65) Prior Publication Data
US 2017/0012781 A1  Jan. 12, 2017

(30) Foreign Application Priority Data
Feb. 6, 2014  (BR) .......................... 1020140029311

(51) Int. Cl.
*H04L 9/32* (2006.01)
*G06F 21/36* (2013.01)
(Continued)

(52) U.S. Cl.
CPC ............ *H04L 9/3263* (2013.01); *G06F 21/34* (2013.01); *G06F 21/36* (2013.01); *G09C 5/00* (2013.01);
(Continued)

(58) Field of Classification Search
CPC .................................................... H04L 9/3263
See application file for complete search history.

(56) References Cited

U.S. PATENT DOCUMENTS

| 2012/0308003 A1 | 12/2012 | Mukherjee |
| 2013/0159186 A1 | 6/2013 | Brudnicki |

FOREIGN PATENT DOCUMENTS

| EP | 2693687 A1 | 2/2014 |
| EP | 2582115 B1 | 12/2015 |

OTHER PUBLICATIONS

International Search Report dated Mar. 30, 2015 for PCT/BR2015/050003.

*Primary Examiner* — Simon P Kanaan
(74) *Attorney, Agent, or Firm* — Troutman Sanders LLP; Ryan A. Schneider

(57) ABSTRACT

A method of generating, emitting and validating a security code in QR Code or Data Matrix formats, which may be printed in physical media, displayed in electronic display or stored in electronic chips through technologies of Radio-Frequency Identification (RFID) or Near Field Communication (NFC). This code is generated using encryption, authenticated cryptography and digital identities or certificates emitted in the standard of Public Key Infrastructure (PKI) by a reliable Certification Authority, providing to validate the code, with (online) or without connectivity (offline) to a data network, by one application installed, by a reading process, cryptographic validation and decryption, allowing to open the security code content. Optionally, it is (Continued)

possible to achieve the emitting of geopositioning and in its security code validation, with the end user identification.

20 Claims, 4 Drawing Sheets

(51) Int. Cl.
*G09C 5/00* (2006.01)
*G06F 21/34* (2013.01)
*H04L 9/00* (2006.01)
*H04L 9/14* (2006.01)
*H04L 9/30* (2006.01)
*H04L 29/06* (2006.01)
*H04W 12/06* (2009.01)

(52) U.S. Cl.
CPC ............ *H04L 9/006* (2013.01); *H04L 9/14* (2013.01); *H04L 9/30* (2013.01); *H04L 63/0823* (2013.01); *H04W 12/06* (2013.01); *H04L 2209/80* (2013.01); *H04L 2209/805* (2013.01)

SOLUTION FOR GENERATING AND ISSUING SECURITY CODES WITH GUARANTEED ISSUER AUTHENTICITY AND ORIGIN

This invention presents a solution consisting of a set of components in computer program, which is insertable in clients' systems through an API (Application Programming Interface), allowing to generate and emit the security code that is, later, printed on physical medium or displayed in electronic displays or stored in electronic chips using the technology of Near Field Communication (NFC) or Radio-Frequency Identification (RFID). API may be provided for using in personal computers (Desktop-Client) or Network Server (Web Services).

BACKGROUND OF THE INVENTION

The generating and emitting system ensures the authenticity and identification of the security code's emitting entity origin, as well, optionally, the emitter geopositioning. With that, there is major security when using the code for activities of inspection, loyalty programs, government programs and processes needing to identify the emitter origin.

DESCRIPTION OF THE STATE OF THE ART

QR Codes or Quick Response Codes are bi-dimensional bar codes for optical reading through a machine, having information about the product, internet site or contact data wherein it is being applied.

Data Matrix Standard codes are matrixes of bi-dimensional bar codes for optical reading through a machine, having information about the product, internet site or contact data wherein it is being applied.

Electronic chips accessible by the technology of Near Field Communication (NFC) or Radio-Frequency Identification (RFID) are chips of low energy consumption, having information about the Product, internet site or contact data wherein it is being applied. They are activated or powered by radio frequency, allowing the communication with a machine through a reader device compatible with these technologies, for reading and recording this data directly in the electronic chip.

Today, the generation this information in these formats is disabled since it may be read by opened applications, generated through a set of data or even an internet site, enabling to be copied by any user. As it does not use a process combined with the identity or digital certificate in the encryption process, there is no authenticity guarantee, emitter origin neither the option to include local geopositioning where this information was generated.

With that, the user has not safe use guarantees of this information, making a solution without added value and easy playback.

In the current process of reading any data collector can achieve the entered information, as well the smartphones with electronic chips readers.

By the present method, security codes are generated and emitted by combining data provided by clients, optionally with geolocation (with latitude and longitude), digitally signed using digital identities or certificates emitted in the Public Key Infrastructure (PKI) standard and encrypted with pair of cryptographic keys for this purpose. Once encrypted, data is enabled for printing in physical medium or presented in electronic display through quick response code (QR Code), Data Matrix Standard Bi-dimensional Code or even for storing in electronic chip of Near Field Communication (NFC) or Radio-Frequency Identification (RFID). The emitted security code validation is performed by communicating data (online), in real time, or without this communication (off-line) by reading devices available in the market, such as data collectors, web cameras, personal computers, tablets or smartphones or personal computers with built-in or coupled camera, which have the specific application installed on.

DESCRIPTION OF THE INVENTION

Components in software exhibited to client through an API (Application Programming Interface) (100) for inserting in its systems, allowing to generate and emit the security code (112), which will be enabled for printing in physical medium (21) or for displaying in electronic display (22) or stored in electronic chips (23).

API may be provided in two formats:

1) Client Format: for applications operating in Desktop environment; or

2) Web Services Format: for applications operating in server environment.

Figure 1:
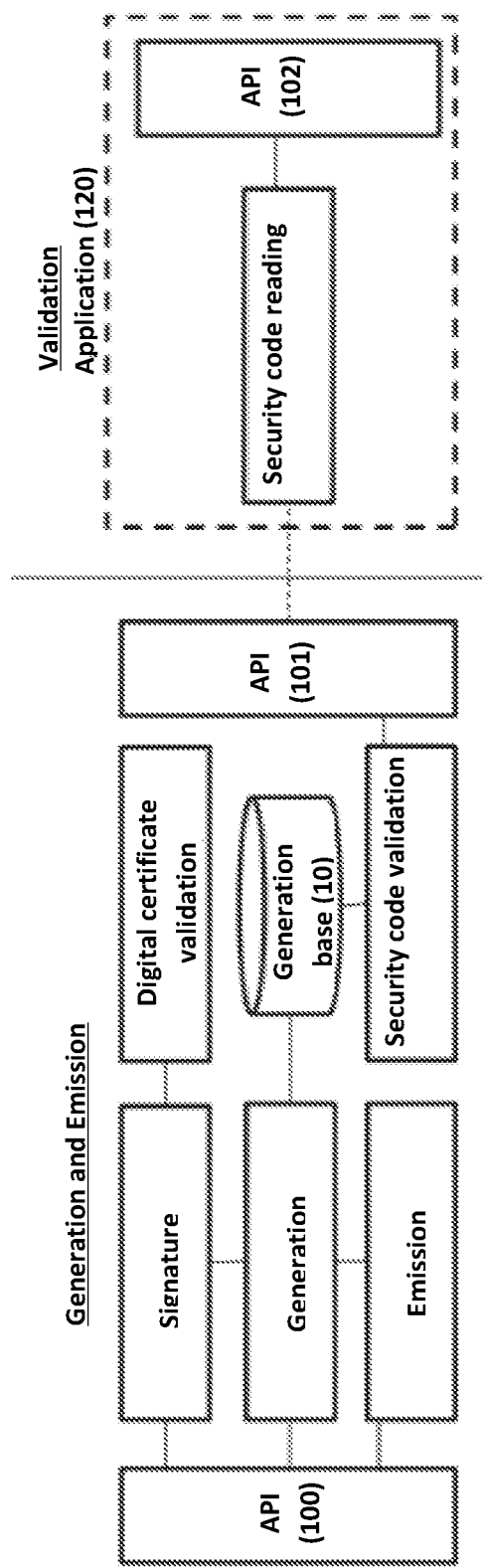
FIG. 1 illustrates a general view of the security element generating system with its main components, which is comprised of steps for generating and emitting, followed by the validation.

FIG. 1 illustrates a general view of the solution, by which through the first API (100) the emitting entity signs digitally, with previous validation of the digital certificate used regarding the integrity, temporal validity, emission chain and revocation based-consultation, following generating a code which is sent to a generation base (10), where the code is enabled for printing in physical medium or displaying in electronic display or storing in electronic chips, allowing a user to validate the code with an application (120) aid of security reader, connected or not to a data network, by using online validation API (101) or off-line validation API (102), concluding the validation process.

Figure 2:
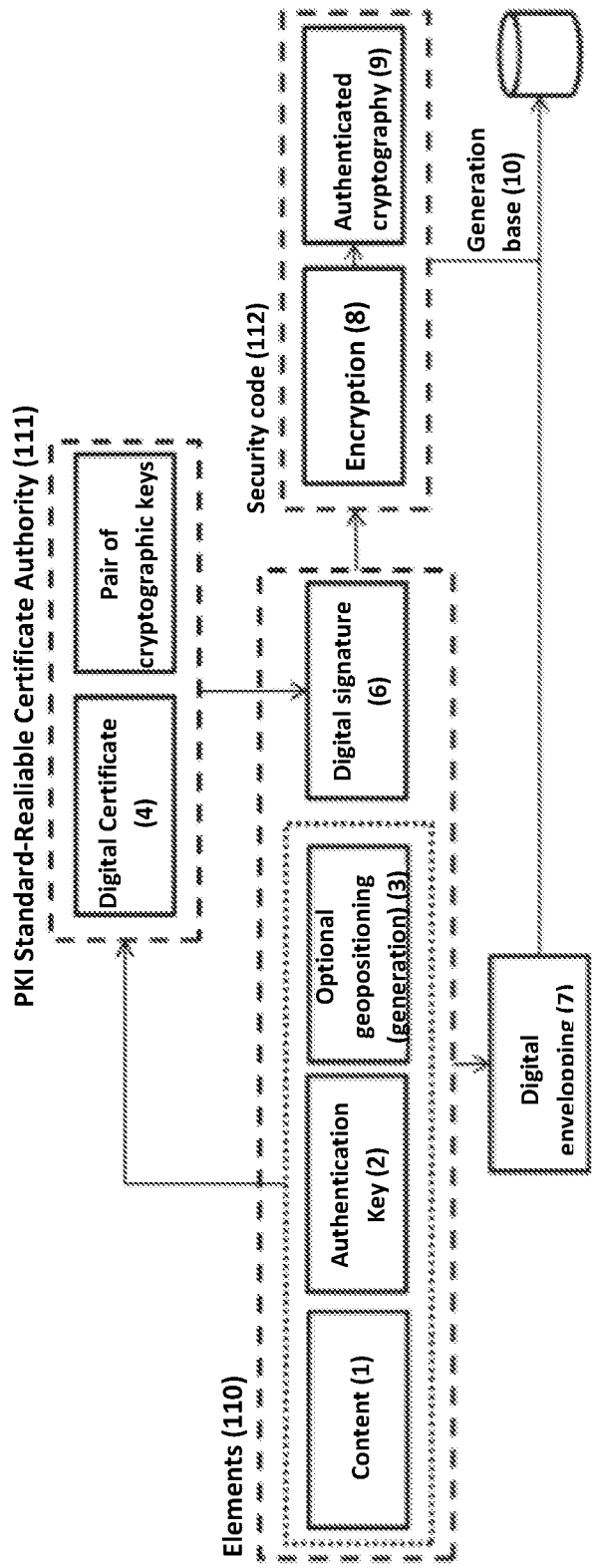
FIGS. 2, 3 and 4 detail the processes of generation, code emission and validation, respectively.

FIG. 2 shows details and elements (110) of the process for generating the system. Initially, API (100) is presented to the Emitter inserting the content (1) to be protected. Then, the content (1), authentication key (2), emitted by the generating system, and, optionally, the geolocation (3) are entered and enabled to be digitally signed.

The identity or digital certificate (4), together with its pair of cryptographic keys (5), emitted in the standard of Public Key Infrastructure (PKI) by a reliable Certification Authority (111) for exclusive and not-transferable use by the emitting entity of the security code upon the Personal Identification Number (PIN) or Password insertion, digitally signing (6) the elements (110), being validated when signing by the component "Digital Certificate Validation".

Then, the digital signature (6), with the content (1), authentication key (2) and geopositioning (3), are digitally enveloped (7) and sent to the generation base (10). Enveloped elements (7) allow generating the security code (112), through encryption (8) and authenticated cryptography (9), which also are sent to the generation base (10).

Digital enveloping (7) consists of registering all attributes and operations performed in the digital certificate validation and in the production of the respective digital signature, according to the signature policy defined by Public Key Infrastructure (PKI), enabling the audit and judicial investigation for proving the authenticity, as well if it was produced by a valid digital certificate upon signing.

Encryption (8) consists of encrypting elements by using the asymmetric cryptographic key of the security code's emitting entity.

The authenticated cryptography (9) performs the cryptographic abstract of the encryption (8), applying to this a symmetric cryptography using the ownership password of the emitting entity, aiming to ensure the encrypted content integrity.

Figure 3:
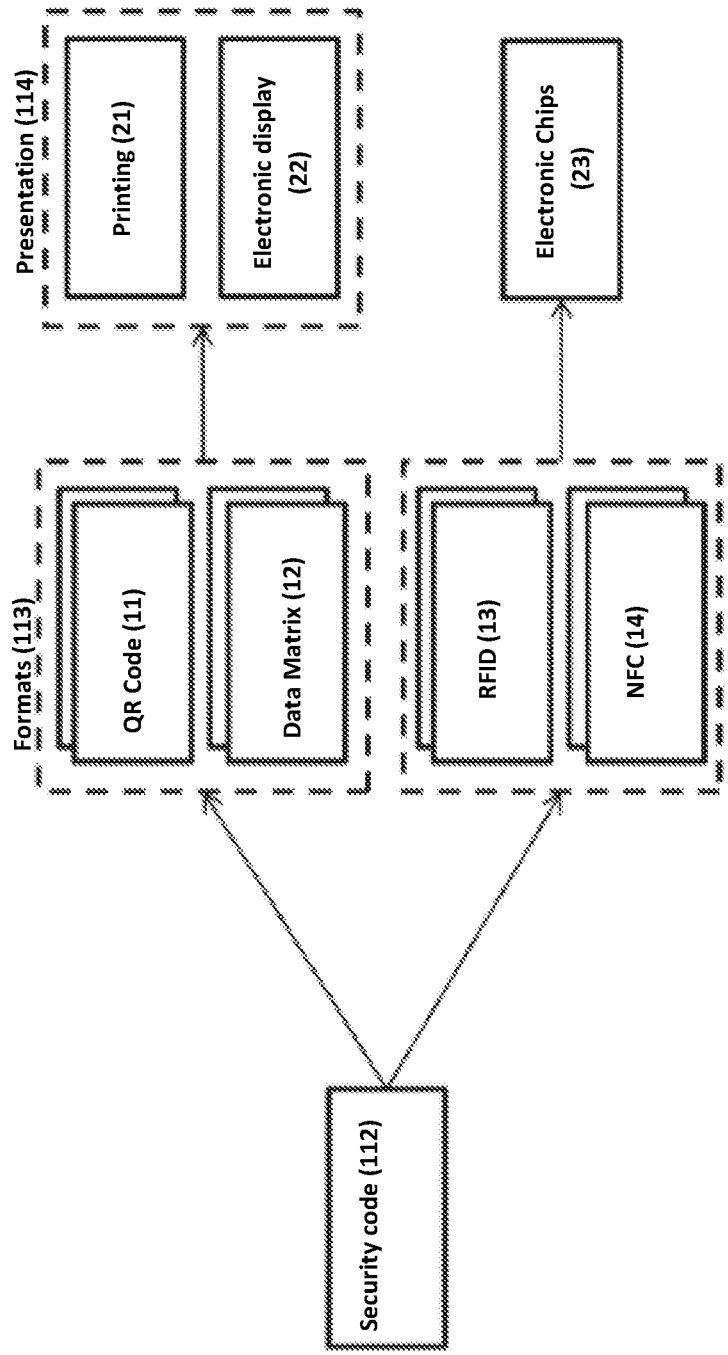

When the security code process (112) is finished, it is transmitted to the Generation base (10), being in the sequence forwarded to the emission process represented in the FIG. 3.

The emission may be performed in four different formats: QR Codes—Quick Response Code (11) or Data Matrix Standard (12), where both may be presented (114) in physical medium (21) or by displaying in electronic display (22). For other formats in electronic chips (23), the security code storage may occur by Radio-Frequency Identification (RFI) (13); or Near Field Communication (NFC) (14).

Figure 4:
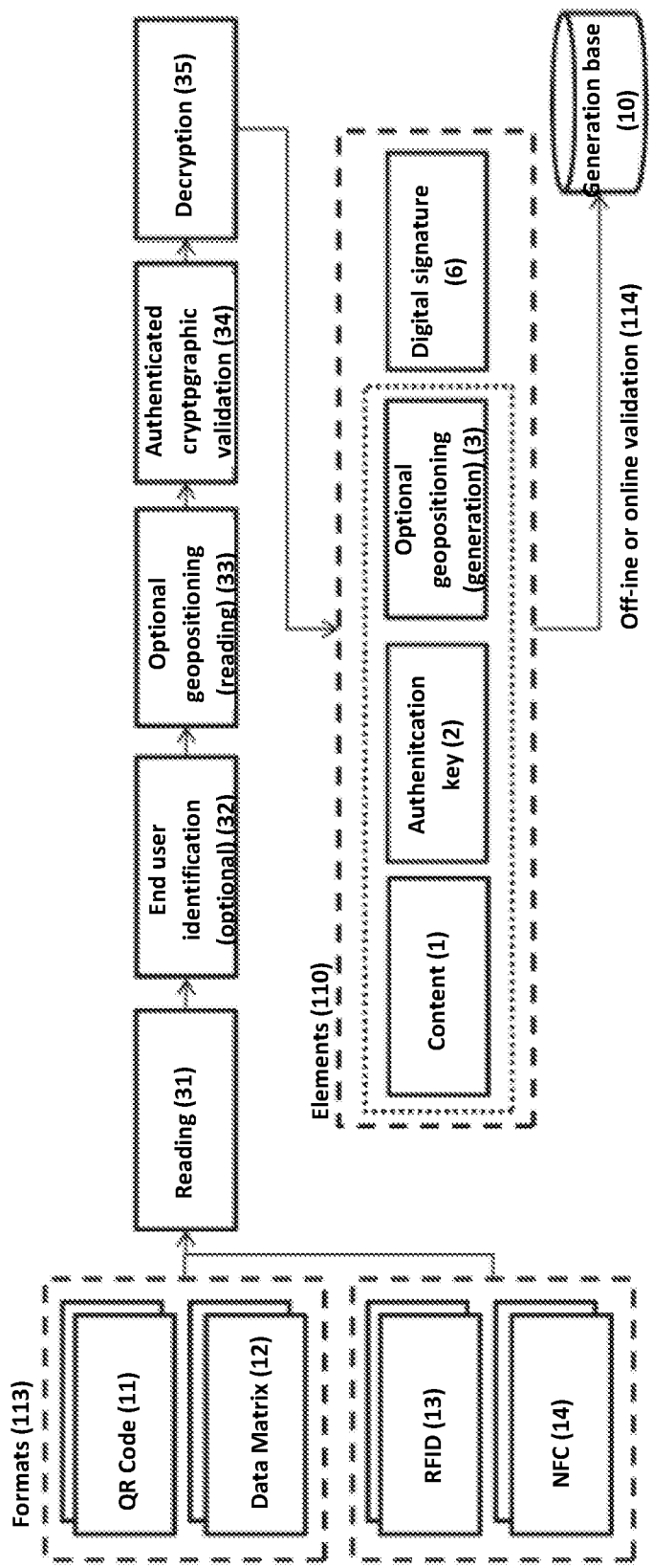

Finally, the validation process is performed, represented in the FIG. 4, which receives the security code (112) in different possible formats (113) and decompose it into elements (110).

The off-line or online validation (115) is performed by one application (120), started with reading (31) the security code (112) and ending with the decryption (35).

The reading (31) occurs according to the format wherein the security code (112) was emitted:

QR Codes (11) or Data Matrix Standard (12) bi-dimensional codes are read by a device with camera having the reading application installed on it (Mobile or Desktop); or RFID (13) or NFC (14), stored in electronic chips (23), which are read by a reader equipment of radio frequency identification or connected to a device having the reading application installed in it (Mobile or Desktop).

Following, there is the option of identifying the end user (32) that may be performed by reading and validating its digital certificate (4) emitted by a reliable Certification Authority (111), authorizing the access or not to the database of this process, with device data that is performing the reading (IP address, Mac Address, IMEI and further information about the operational system and Hardware used). Other optional data is geopositioning capture (33) with due registration in the central database.

Following the validation process (114) the authenticated cryptography (34) is validate, through cryptographic abstract and password used by the security code's emitting entity, to validate if the cryptographic abstract entered into the security code (112) matches with its reproduction while reading (31).

By the end, the security code (112) decryption (35) is performed with the emitter's pair of cryptographic keys (5), "opening" its elements (110) for presenting to the end user in off-line mode (115) or, having data network availability—online (115), complementing the communication with the remote server for achieving the digital enveloping (7).

The invention claimed is:

1. A method comprising:
   receiving a request for a security code from a user-client;
   in response to receiving the request from the user-client, generating the security code comprising as elements message content and an authentication key by using an identity or digital certificate in the PKI standard emitted by a reliable Certification Authority;
   emitting the security code to the user-client;
   printing the security code in a physical medium;
   validating the security code through a validation application comprising the steps of:
      reading the printed security code;
      cryptographic validation; and
      decryption; and
   providing the elements of the security code to the user-client, ensuring the origin and authenticity of the information transmitted;
   wherein the elements of the security code further comprise geolocation data and a digital signature, the digital signature being generated by using an identity or digital certificate with a respective pair of cryptographic keys emitted in the PKI standard by a reliable Certification Authority; and
   wherein the security code has formats selected from the group consisting of Quick Response Code and Data Matrix Standard.

2. The method according to claim 1 further comprising storing the security code in an electronic chip.

3. The method according to claim 1, wherein the validation application further comprises identifying an end user.

4. The method according to claim 3, wherein the validation application operates in real time or without connectivity to a data network by a program installed in the user-client.

5. The method according to claim 1 further comprising displaying the security code via an electronic display.

6. The method according to claim 1 further comprising storing the security code in an electronic chip through Radio-Frequency Identification (RFID).

7. The method according to claim 1 further comprising storing the security code in an electronic chip through Near Field Communication (NFC).

8. The method according to claim 1, wherein the validation application further comprises identifying the geolocation from the geolocation data.

9. A method comprising:
   receiving a request for a security code from a user-client;
   in response to receiving the request from the user-client, generating the security code comprising as elements message content, geolocation data, an authentication key, and a digital signature, the digital signature being generated by using an identity or digital certificate with a respective pair or cryptographic keys emitted in the PKI standard by a reliable Certification Authority;
   emitting the security code to the user-client;
   printing the security code in a physical medium;
   displaying the security code via an electronic display;
   validating the security code through a validation application comprising the steps of:
      reading the printed security code;
      cryptographic validation;
      decryption; and
      identifying an end user; and
   providing the elements of the security code to the user-client, ensuring the origin and authenticity of the information transmitted;
   wherein the security code has formats selected from the group consisting of Quick Response Code and Data Matrix Standard.

10. A method comprising:
    receiving a request for a security code from a user-client;
    in response to receiving the request from the user-client, generating the security code comprising as elements message content and an authentication key by using an identity or digital certificate in the PKI standard emitted by a reliable Certification Authority;
emitting the security code to the user-client;
printing the security code in a physical medium;
storing the security code in an electronic chip;
validating the security code through a validation application comprising the steps of:
reading the printed security code;
cryptographic validation;
decryption; and
identifying an end user; and
providing the elements of the security code to the user-client, ensuring the origin and authenticity of the information transmitted;
wherein the elements of the security code further comprise geolocation data and a digital signature, the digital signature being generated by using an identity or digital certificate with a respective pair of cryptographic keys emitted in the PKI standard by a reliable Certification Authority; and
wherein the security code has formats selected from the group consisting of Quick Response Code and Data Matrix Standard.

11. The method according to claim 4, wherein the validation application operates online when in real time.

12. The method according to claim 4, wherein the validation application operates off-line when without connectivity.

13. The method according to claim 9 further comprising storing the security code in an electronic chip.

14. The method according to claim 9, wherein the validation application operates on-line, in real time, or off-line without connectivity, to a data network by a program installed in the user-client.

15. The method according to claim 9 further comprising storing the security code in an electronic chip through Radio-Frequency Identification (RFID).

16. The method according to claim 9 further comprising storing the security code in an electronic chip through Near Field Communication (NFC).

17. The method according to claim 9, wherein the validation application further comprises identifying the geolocation from the geolocation data.

18. The method according to claim 10 further comprising displaying the security code via an electronic display.

19. The method according to claim 10, wherein storing the security code in the electronic chip is through one or both of Radio-Frequency Identification (RFID) and Near Field Communication (NFC).

20. The method according to claim 10, wherein the validation application further comprises identifying the geolocation from the geolocation data.

* * * * *